Jan. 13, 1953
R. C. BAIRD
2,625,383
GAS SCRUBBER
Filed May 21, 1951
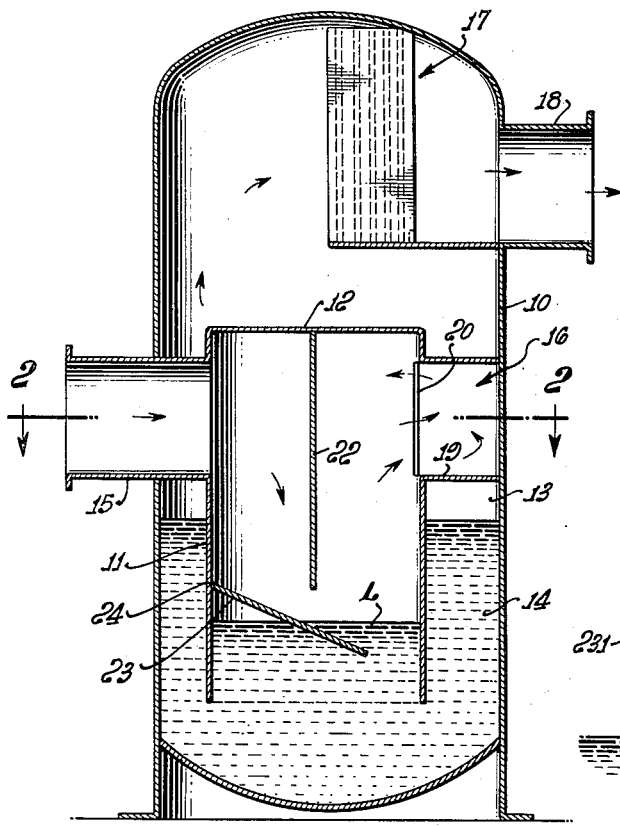
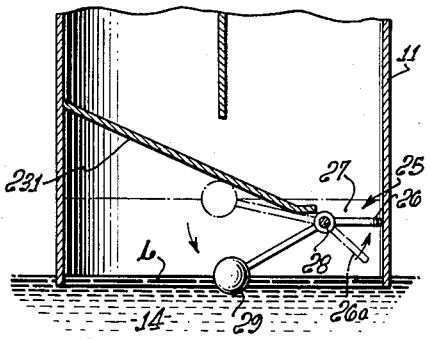
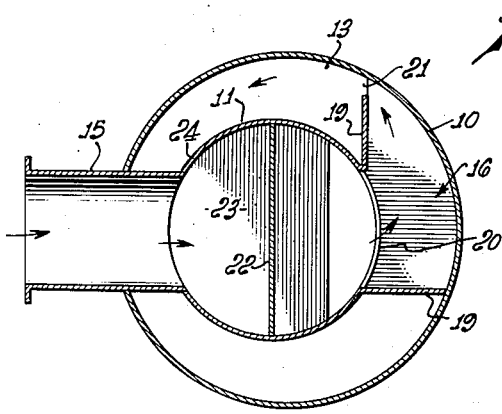
RAYMOND C. BAIRD,
INVENTOR.
BY Halvin White
ATTORNEY.

Patented Jan. 13, 1953

2,625,383

UNITED STATES PATENT OFFICE 2,625,383

GAS SCRUBBER

Raymond C. Baird, Los Angeles, Calif., assignor to The Fluor Corporation, Ltd., Los Angeles, Calif., a corporation of California Application May 21, 1951, Serial No. 227,411

9 Claims. (Cl. 261—119)

This invention has to do with improvements in gas scrubbers of the oil bath type, and particularly of the variable weir form in which the incoming gas is directed downwardly into the oil bath while flowing beneath a deflecting baffle or weir. While adaptable to various specific forms of gas scrubbers of this general type, the invention will be described specifically, though typically, as embodied in a scrubber comprising an outer shell containing a body of liquid and also an inner shell having an open bottom immersed in the liquid. The inner shell contains a depending weir in such relation to a gas inlet and an outlet leading into the space between the shells, that the entering gas is deflected downwardly through the oil bath and then passes upwardly and outwardly into the inter-shell chamber for final discharge from the outer shell.

The invention has for one of its major objects the elimination of excessive carry-over losses of the scrubbing liquid, especially during heavy throughput gas surges. It has been found in practice that where the gas stream is permitted to flow beneath the weir into a liquid body having substantially constant surface area at the various levels to which the liquid may be depressed in accordance with the gas pressure, high gas velocity or pressure surges result in excessive entrainment of the oil in the gas stream, to a degree such that in a relatively short time the scrubber oil is lost, or its maintenance requires a high replacement rate.

The invention is predicated upon the concept of progressively decreasing the surface area of the oil swept across by the gas stream, as the gas pressure increases whether by reason of increasing velocity or sudden pressure surges, and thus altering the physical contact relation between the oil and gas, and the oil-to-gas ratio at the point of mixing, to a degree precluding the possibility of excessive liquid entrainment in the gas.

The invention contemplates further the prevention of possible by-passing of the stream, as a sudden pressure surge occurs, from within the inside shell to the inter-shell space without discharging through the inner shell nozzle or outlet. For this purpose I provide a variable control element in the nature of a valve, governed preferably in accordance with the oil level, and operating to restrict or close the communication between the upper interior of the inner shell through which the gas normally flows, from the base of the outer shell containing the oil bath.

Further features and objects of the invention, as well as the details of an illustrative embodiment will be understood more fully from the following description throughout which reference is had to the accompanying drawing, in which:

Fig. 1 is a view showing the scrubber in vertical section;

Fig. 2 is a cross section on line 2—2 of Fig. 1, and

Fig. 3 is a fragmentary sectional view illustrating a variational form of the invention.

The scrubber comprises a vertically extending outer shell 10 containing an inner reduced diameter shell 11 having an open bottom and a top closure 12, the inner shell being annularly spaced at 13 from the outer shell and immersed as illustrated in a body of oil 14. Dust-laden gas enters the inner shell through an inlet 15 and flows through an outlet nozzle generally indicated at 16 into the inter-shell space for final discharge through the conventionally illustrated scrubber element or baffle nest 17 to the outlet 18. The nozzle structure 16 may comprise a sheet metal body 19 leading from opening 20 in the inner shell and having somewhat narrow spacing at 21 from the outer shell 10 so that the gas is given circular and high velocity flow within space 13, causing centrifugal deentrainment of oil particles carried by the gas. Oil particles thus separated, as well as the oil deentrained in the scrubber element 17, are returned to the liquid body 14.

Shell 11 contains a centrally positioned baffle or weir plate 22 which depends within the oil body a distance such that in flowing from the inlet 15 to the outlet 16, the gas is required to pass beneath the weir and into intimate contact with the oil. As the inlet gas pressure increases, whether in accordance with increasing velocity or as sudden pressure surges, the oil level L within the inner chamber 11 is depressed. As previously indicated, in the past, the surface area of the oil exposed to the gas stream sweeping beneath the weir, has been permitted to remain substantially constant, with resultant excessive oil carry-over as gas pressure surges occur.

In accordance with the invention, provision is made for progressively reducing the surface area of the liquid as its level L is depressed, placing within shell 11 directly beneath the weir 22, an inclined baffle 23 extending downwardly and part way across the chamber from one side thereof at 24. As will be apparent, upon depression of the level L, the surface area of the oil exposed to the gas stream decreases in accordance with the baffle angularity, thus affording decreasing oil-to-gas surface contact area which precludes the possibility of excessive liquid entrainment despite high gas velocities or sudden pressure surges.

Upon the occurrence of extreme pressure surges, the gas may tend to by-pass the outlet nozzle 16 by flowing directly out of the bottom of the inner shell. Referring to Fig. 3, avoidance of such by-passing is assured by an essentially valvular control, generally indicated at 25, shown typically as comprising a flap or valve 26 corresponding in shape to the space at 27 between baffle 23f and the shell wall, the valve being carried by the baffle and mounted for oscillation on shaft 28. Attached to the valve is a float 29 which rises and falls with the oil level L. Upon the occurrence of a sudden gas pressure surge tending to force the oil level down below the baffle 23f, the float 29, in dropping with the oil level, swings valve 26 to the solid line position of Fig. 3, thus substantially closing off the space 27 and requiring the gas to flow to the outlet nozzle 16. As the oil level restores to a normal height, the valve is swung open, as to the broken line position 26a, to permit upward flow of the oil as required for scrubbing contact with the gas.

I claim:

1. A gas scrubber comprising a shell having an inlet and an outlet, a weir in said shell between the inlet and outlet and depending within a body of liquid in the chamber so that gas flowing from said inlet to the outlet tends to depress the liquid level and passes beneath said weir, a baffle positioned in the liquid below said weir and having a lower edge spaced from the shell wall, said baffle being inclined in the direction of the gas flowing beneath the weir and intersecting the depressed liquid surface so that as the liquid level continues to be depressed, progressively less surface area of the liquid is exposed to the gas stream flowing beneath the weir, and means forming a chamber receiving liquid displaced from said shell as the liquid level therein is depressed.

2. A gas scrubber comprising a shell having an inlet and an outlet, a weir in said shell between the inlet and outlet and depending within a body of liquid in the chamber so that gas flowing from said inlet to the outlet tends to depress the liquid level and passes beneath said weir, a baffle positioned in the liquid below said weir and extending from one side of the shell only partially across its area, said baffle being inclined in the direction of the gas flow beneath the weir and intersecting the depressed liquid surface so that as the liquid level is depressed, progressively less surface area of the gas is exposed to the gas stream flowing beneath the weir, and means forming a chamber receiving liquid displaced from said shell as the liquid level therein is depressed.

3. A gas scrubber comprising a shell having an inlet and an outlet, a weir in said shell between the inlet and outlet and depending within a body of liquid in the chamber so that gas flowing from said inlet to the outlet tends to depress the liquid level and passes beneath said weir, an inclined baffle positioned in the liquid below said weir and having a lower edge spaced from the shell wall, said baffle intersecting the depressed liquid surface so that as the liquid level continues to be depressed, progressively less surface area of the liquid is exposed to the gas stream flowing beneath the weir, a movable valve variably restricting the space between said baffle and the shell wall, and means forming a chamber receiving liquid displaced from said shell as the liquid level therein is depressed.

4. A gas scrubber comprising a shell having an inlet and an outlet, a weir in said shell between the inlet and outlet and depending within a body of liquid in the chamber so that gas flowing from said inlet to the outlet tends to depress the liquid level and passes beneath said weir, an inclined baffle positioned in the liquid below said weir and having a lower edge spaced from the shell wall, said baffle intersecting the depressed liquid surface so that as the liquid level continues to be depressed, progressively less surface area of the liquid is exposed to the gas stream flowing beneath the weir, a movable valve variably restricting the space between said baffle and the shell wall, a float for actuating said valve in accordance with variations of the liquid level, and means forming a chamber receiving liquid displaced from said shell as the liquid level therein is depressed.

5. A gas scrubber comprising a shell having an inlet and an outlet, a weir in said shell between the inlet and outlet and depending within a body of liquid in the chamber so that gas flowing from said inlet to the outlet tends to depress the liquid level and passes beneath said weir, and an inclined baffle extending downwardly from the shell wall and in the liquid below said weir, the lower edge of the baffle being spaced from the shell wall and the baffle intersecting the depressed liquid surface so that as the liquid continues to be depressed progressively less surface area of the liquid is exposed to the gas stream flowing beneath the weir, a valve hinged to said lower edge of the baffle and acting to variably restrict the space between said edge and the shell wall, a float operating to control said valve in accordance with the liquid level, and means forming a chamber receiving liquid displaced from said shell as the liquid level therein is depressed.

6. A gas scrubber comprising an outer shell having a gas outlet and containing a body of liquid, an inner open bottom shell within and spaced from said outer shell and having a gas inlet and a gas outlet discharging into the outer shell, a weir in said inner shell between its gas inlet and outlet and depending within said body of liquid so that the gas flowing from said inlet tends to depress the liquid level in the inner shell and passes beneath said weir, and a baffle having a lower edge spaced from the inner shell wall and positioned in the liquid directly below said weir, said baffle being inclined in the direction of the gas flowing beneath the weir and intersecting the depressed liquid surface so that as the liquid level is depressed, progressively less surface area of the liquid is exposed to the gas stream flowing beneath the weir, liquid being displaced from said shell into the space between the inner and outer shells as the liquid level is depressed below the weir.

7. A gas scrubber comprising an outer shell having a gas outlet and containing a body of liquid, an inner open bottom shell within said outer shell and having a gas inlet and a gas outlet discharging into the outer shell, a weir in said inner shell between its gas inlet and outlet and depending from the top of the inner shell and below its inlet to a location within said body of liquid above the bottom of the inner shell so that the gas flowing from said inlet tends to depress the liquid level in the inner shell and passes beneath said weir, and a baffle extending downwardly within and from one side of the inner shell and spaced at its lower edge from the opposite side of the inner shell, said baffle intersecting the liquid surface directly below said weir so that as the liquid level is depressed, progressively less surface area of the liquid is exposed to the gas stream flowing beneath the weir.

8. A gas scrubber comprising an outer shell having a gas outlet and containing a body of liquid, an inner open bottom shell within said outer shell and having a gas inlet and a gas outlet discharging into the outer shell, a weir in said inner shell between its gas inlet and outlet and depending from the top of the inner shell and below its inlet to a location within said body of liquid above the bottom of the inner shell so that the gas flowing from said inlet tends to depress the liquid level in the inner shell and passes beneath said weir, a baffle extending downwardly within and from one side of the inner shell and spaced at its lower edge from the opposite side of the inner shell, said baffles intersecting the liquid surface directly below said weir so that as the liquid level is depressed, progressively less surface area of the liquid is exposed to the gas stream flowing beneath the weir, and means variably restricting the space between said baffle and the shell wall.

9. A gas scrubber comprising an outer shell having a gas outlet and containing a body of liquid, an inner open bottom shell within said outer shell and having a gas inlet and a gas outlet discharging into the outer shell, a weir in said inner shell between its gas inlet and outlet and depending from the top of the inner shell and below its inlet to a location within said body of liquid above the bottom of the inner shell so that the gas flowing from said inlet tends to depress the liquid level in the inner shell and passes beneath said weir, a baffle extending downwardly within and from one side of the inner shell and spaced at its lower edge from the opposite side of the inner shell, said baffles intersecting the liquid surface directly below said weir so that as the liquid level is depressed, progressively less surface area of the liquid is exposed to the gas stream flowing beneath the weir, means variably restricting the space between said baffle and the shell wall, a movable valve carried by said baffle and variably restricting the space between the baffle and inner shell wall, and a float for actuating said valve in accordance with variations of the liquid level.

RAYMOND C. BAIRD.

REFERENCES CITED

The following references are of record in the file of this patent:

UNITED STATES PATENTS

| Number | Name | Date |
|---|---|---|
| 99,864 | Ebert | Feb. 15, 1870 |
| 1,817,265 | Pando | Aug. 4, 1931 |
| 2,119,207 | Gibbs | May 31, 1938 |
| 2,459,635 | Fenn | Jan. 18, 1949 |